(12) United States Patent
Hampshire et al.

(10) Patent No.: US 6,574,068 B1
(45) Date of Patent: Jun. 3, 2003

(54) SERVO CONTROL USING CONTINUOUS POSITION ERROR SIGNAL WITH HIGH ORDER POLYNOMIAL COMPONENT

(75) Inventors: Randall D. Hampshire, San Marcos, TX (US); Donald B. Douglas, Edmond, OK (US); Clyde E. Goodner, Midwest City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/551,331

(22) Filed: Apr. 18, 2000

Related U.S. Application Data

(60) Provisional application No. 60/130,315, filed on Apr. 21, 1999.

(51) Int. Cl.[7] ............................................. G11B 5/596
(52) U.S. Cl. ................................. 360/77.08; 360/78.14
(58) Field of Search ........................... 360/75, 76, 77.01, 360/77.02, 770.7, 77.08, 78.04, 78.14

(56) References Cited

U.S. PATENT DOCUMENTS

| | | |
|---|---|---|
| 4,878,135 A | 10/1989 | Makino et al. |
| 4,969,059 A | 11/1990 | Volz et al. |
| 5,109,307 A | 4/1992 | Sidman |
| 5,136,439 A | 8/1992 | Weispfenning et al. |
| 5,170,299 A | 12/1992 | Moon |
| 5,262,907 A | 11/1993 | Duffy et al. |
| 5,457,587 A | 10/1995 | Suzuki |
| 5,510,939 A | 4/1996 | Lewis |
| 5,566,034 A | 10/1996 | Shumaker |
| 5,600,506 A | 2/1997 | Baum et al. |
| 5,602,693 A | 2/1997 | Brunnett et al. |
| 5,615,065 A | 3/1997 | Cheung |
| 5,717,538 A | 2/1998 | Cheung et al. |
| 5,760,990 A | 6/1998 | Ukani et al. |
| 5,774,297 A | 6/1998 | Hampshire et al. |
| 5,781,365 A | 7/1998 | Romano et al. |
| 5,867,341 A | 2/1999 | Volz et al. |
| 5,875,066 A | 2/1999 | Ottesen |
| 5,982,173 A | * 11/1999 | Hagen ........................ 324/212 |

* cited by examiner

*Primary Examiner*—Andrew L. Sniezek
(74) *Attorney, Agent, or Firm*—Fellers, Snider, et al.

(57) ABSTRACT

An apparatus and method for improved servo control in a disc drive. A rotatable disc has first, second, third and fourth radially staggered servo burst patterns which define a plurality of concentric tracks. An actuator assembly supports a transducing head adjacent the tracks. A servo circuit combines respective at least third order polynomial functions of burst signals from the first and second, and third and fourth, burst patterns to generate a continuous function position error signal (PES) with normalized absolute magnitudes of 0 when the head is positioned at track centers, 0.5 at track boundaries, and 0.25 at quarter-track locations, and with substantially linear slope therebetween. The servo circuit applies current to an actuator motor to position of the head relative to a selected track in relation to the magnitude of the PES.

20 Claims, 7 Drawing Sheets

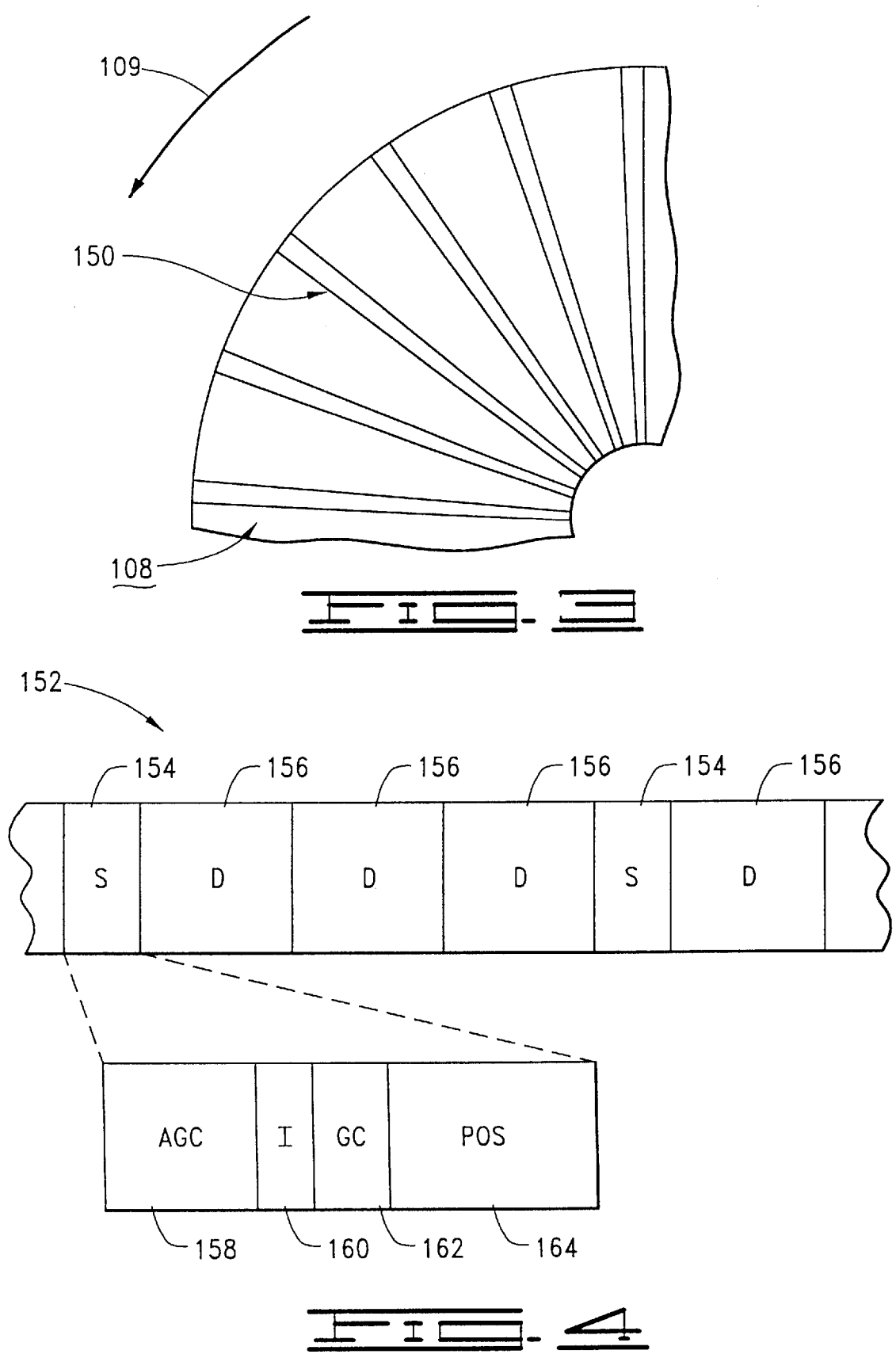

SERVO CONTROL USING CONTINUOUS POSITION ERROR SIGNAL WITH HIGH ORDER POLYNOMIAL COMPONENT

RELATED APPLICATIONS

This application claims priority to U.S. Provisional Application No. 60/130,315 filed Apr. 21, 1999.

FIELD OF THE INVENTION

This invention relates generally to the field of disc drive data storage devices, and more particularly, but not by way of limitation, to improving servo performance of a disc drive through the generation and use of a continuous, high order position error signal to compensate for head construction and performance variations.

BACKGROUND

Disc drives are used as primary data storage devices in modern computer systems and networks, due to the efficient and cost-effective manner in which large amounts of computerized data can be stored and retrieved. Disc drives of the present generation have data storage capacities measured in excess of several gigabytes (GB) and can be used alone (as in a typical personal computer configuration) or in multi-drive data storage arrays (as with an internet network server or a mainframe computer).

A typical disc drive comprises a plurality of rigid magnetic storage discs which are journaled about a spindle motor for rotation at a constant high speed. An array of read/write transducing heads are provided to transfer data between tracks of the discs and a host computer in which the disc drive is mounted. The heads are mounted to a rotary actuator assembly and are controllably positioned adjacent the tracks by a closed loop servo system.

The servo system primarily operates in one of two selectable modes: seeking and track following. A seek operation entails moving a selected head from an initial track to a destination track on the associated disc surface through the initial acceleration and subsequent deceleration of the head away from the initial track and toward the destination track. A velocity control approach is used whereby the velocity of the head is repeatedly measured and compared to a velocity profile defining a desired velocity trajectory for the seek. Once the head has settled on the destination track, the servo system enters a track following mode of operation wherein the head is caused to follow the destination track until the next seek operation is performed.

Both track seeking and track following operations typically require generation of a position error signal (PES) which gives an indication of the radial position of the head with respect to the tracks on the disc. The PES is typically derived from servo data embedded on each recording surface among user data blocks at predetermined intervals.

The head provides the servo data to the servo system which, in turn, generates the PES with a magnitude that is typically equal to zero when the head is positioned over the center of the track ("on track"), and is nominally linearly proportional to a relative misposition distance ("off track") between the head and the center of the track, with a polarity indicative of radial off track direction. To provide stable operation, the transfer function relating PES to actual radial misposition should be constant and independent of distance off track in the presence of variations in head signal amplitude, linear recording bit density, head to media spacing and head skew angle.

Recently, magneto-resistive (MR) heads have supplanted prior use of thin film heads due to the superior magnetic recording properties associated with MR heads. Generally, an MR head includes a magneto-resistive read element characterized as having a baseline direct current (DC) electrical resistance that changes when subjected to magnetic fields of selected orientation. An MR head can detect previously recorded data in response to variations in voltage measured across the MR head when a read bias current of predetermined magnitude is passed through the MR element.

Although MR heads facilitate ever greater levels of magnetic recording densities, there are nevertheless disadvantages associated with such heads when used as position transducers, due to nonlinear readback response with respect to position. This nonlinearity is due to a variety of factors, including MR element bias, sensitivity differences across pole face geometry of the MR elements, and aggravation of the inherent nonlinearity of end fringing fields, as the width of a typical MR element readback gap is typically appreciably less than the width of the tracks on the associated disc.

Historically, PES nonlinearity primarily affected track seeking performance, producing track arrival over-shoot or under-shoot which prolonged arrival settling time. PES nonlinearity did not so adversely affect track following performance (i.e., did not induce significant track misregistration, or TMR), because the track center for reading and writing, defined by servo bursts of the servo information (typically referred to as A, B, C and D bursts) nominally coincided with a null response of positioning burst signals A−B=0.

With MR heads, however, PES nonlinearity also affects TMR control during track following because the MR element is physically separated from the write element of the head by a distance governed by the design of the head; thus, inaccuracies can arise as a result of head skew (with respect to the disc) and head fabrication tolerances. Because the write gap and the read gap are at slightly different radial positions, the PES must be operated at a position A≠B to properly center the write gap over the track. Further, non-uniformity in readback magnetic field sensitivity generally produces a positional shift in null response of bursts A−B=0. Unless properly characterized and compensated, the nonlinearity will produce a discrepancy from desired positioning and can introduce instabilities into the servo system.

PES nonlinearity due to the use of MR heads can not only therefore adversely affect seek performance, but track following performance as well. Such effects can further serve as a limit on achievable track densities (and hence data storage capacities), due to the TMR budget necessary to minimize interference with (such as overwriting of) adjacent tracks.

Accordingly, there remains a continual need in the art for improvements whereby disc drive performance can be optimized through minimizing the effects of head position nonlinearities.

SUMMARY OF THE INVENTION

The present invention provides an apparatus and method for improving disc drive servo control performance.

In accordance with preferred embodiments, a rotatable disc has first, second, third and fourth radially staggered servo burst patterns which define a plurality of concentric tracks. An actuator assembly supports a transducing head adjacent the tracks.

A servo circuit combines respective at least third order polynomial functions of burst signals from the first and second, and from the third and fourth, burst patterns to generate a continuous function position error signal (PES). The PES preferably has normalized absolute magnitudes of 0 when the head is positioned at track centers, 0.5 at track boundaries, and 0.25 at quarter-track locations, and with substantially linear slope therebetween. The servo circuit applies current to an actuator motor to position of the head relative to a selected track in relation to the magnitude of the PES.

An advantage associated with the present invention is the potentially wider range of head width, sensitivity and symmetry variations that can be accommodated using the present invention as embodied herein. A significant economic benefit can inure due to reduced manufacturing costs through the relaxation of head tolerances, improvements in manufacturing yields and reductions in manufacturing costs.

Moreover, the present invention can be further utilized to provide feedback to a supplier of the heads, resulting in improved head manufacturing process control.

These and various other features and advantages which characterize the present invention will be apparent from a reading of the following detailed description and a review of the associated drawings.

BRIEF DESCRIPTION OF THE DRAWINGS

FIG. 3 illustrates the manner in which servo data are stored on each of the disc recording surfaces of the disc drive.

FIG. 4 is a representation of a selected servo block from FIG. 3.

FIGS. 5 and 6 illustrate the position field of the servo block of FIG. 4 for a plurality of adjacently disposed tracks.

DETAILED DESCRIPTION

Figure 1:
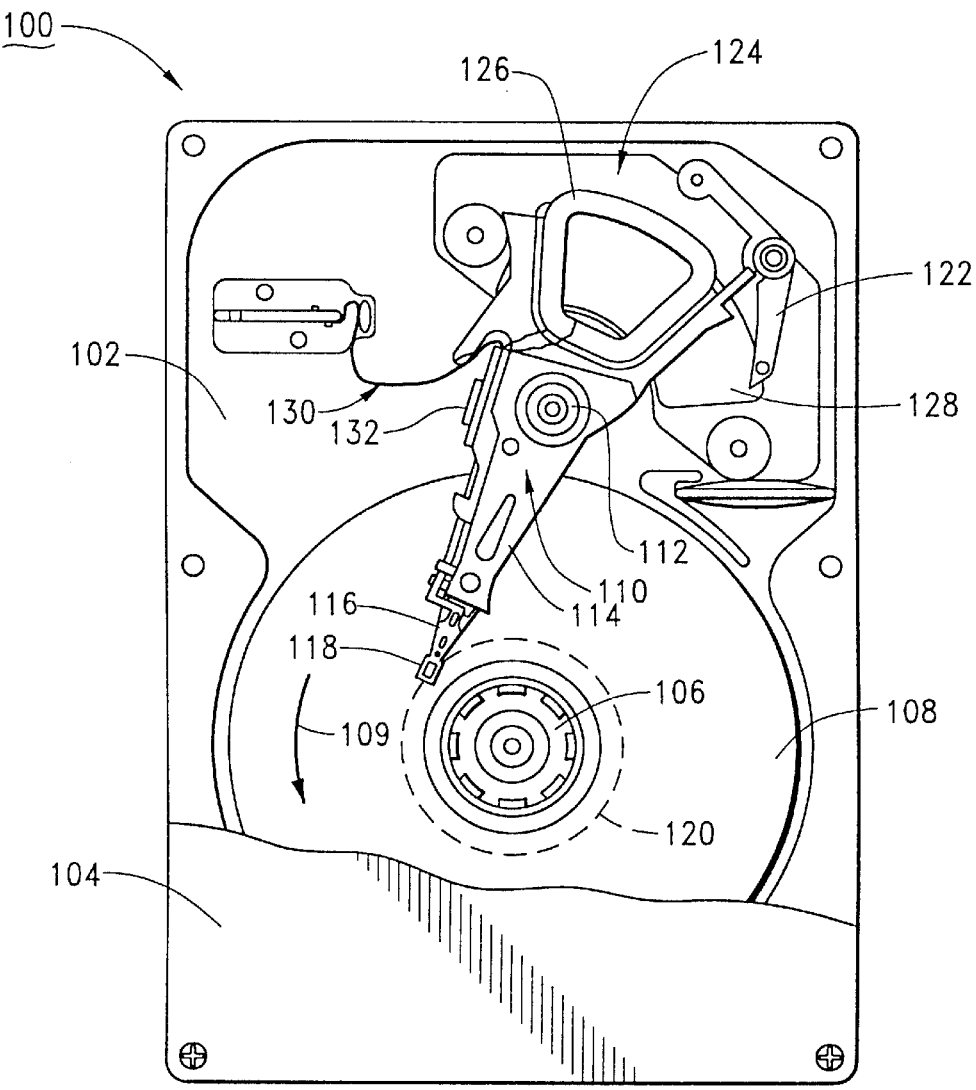
FIG. 1 is a top plan view of a disc drive constructed in accordance with preferred embodiments of the present invention.

Referring to FIG. 1, shown therein is a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126.

A flex assembly 130 provides the requisite electrical connection paths for the actuator assembly 110 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
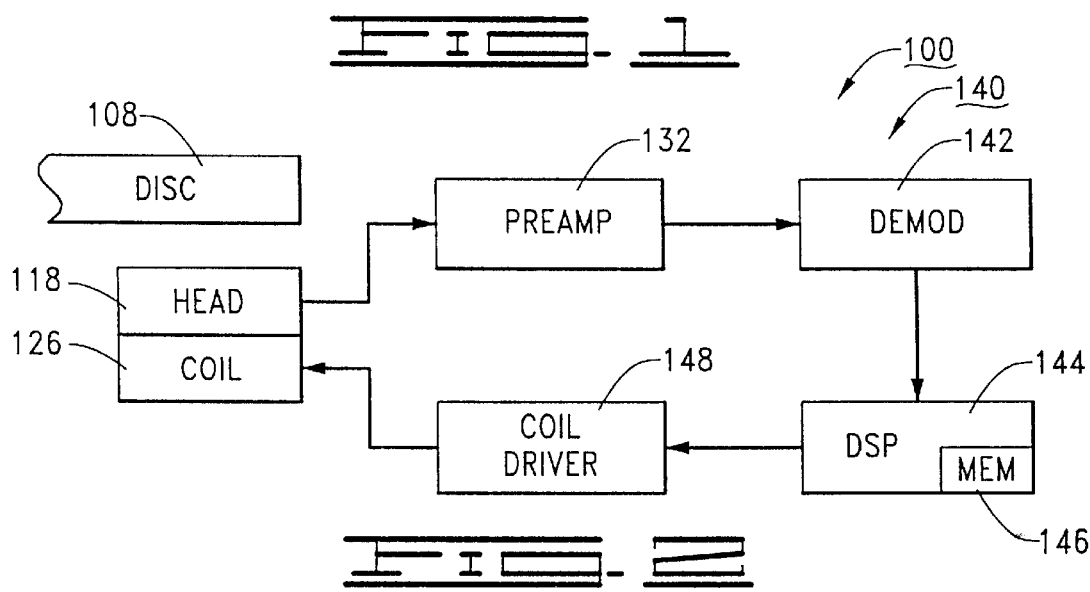
FIG. 2 is a functional block diagram of a servo circuit of the disc drive of FIG. 1.

FIG. 2 shows a functional block diagram of a servo circuit 140 of the disc drive 100 of FIG. 1 which uses servo data arranged on the discs 108 to control the position of the heads 118. The servo data are transduced by the selected head 118, preamplified by the preamp 132, and provided to a demodulation circuit 142 which conditions the servo data for processing by a servo processor 144, which preferably comprises a digital signal processor (DSP). The DSP 144 uses programming steps stored in DSP memory 146 (MEM) as well as commands issued by a top-level disc drive processor (not shown) to output current command signals to coil driver circuitry 148 which, in turn, adjusts the amount of current applied to the coil 126.

Figure 5:
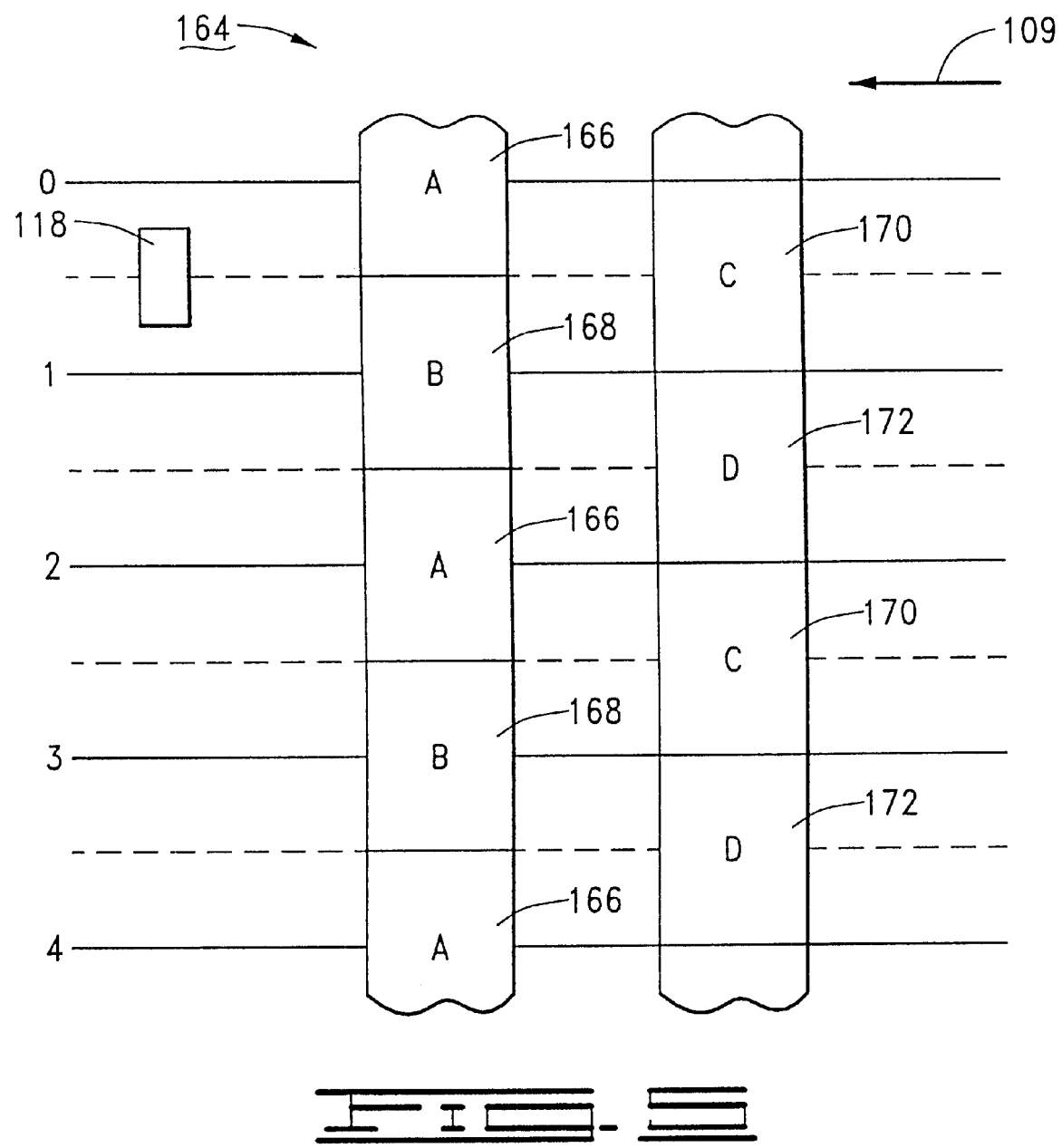
Figure 5:
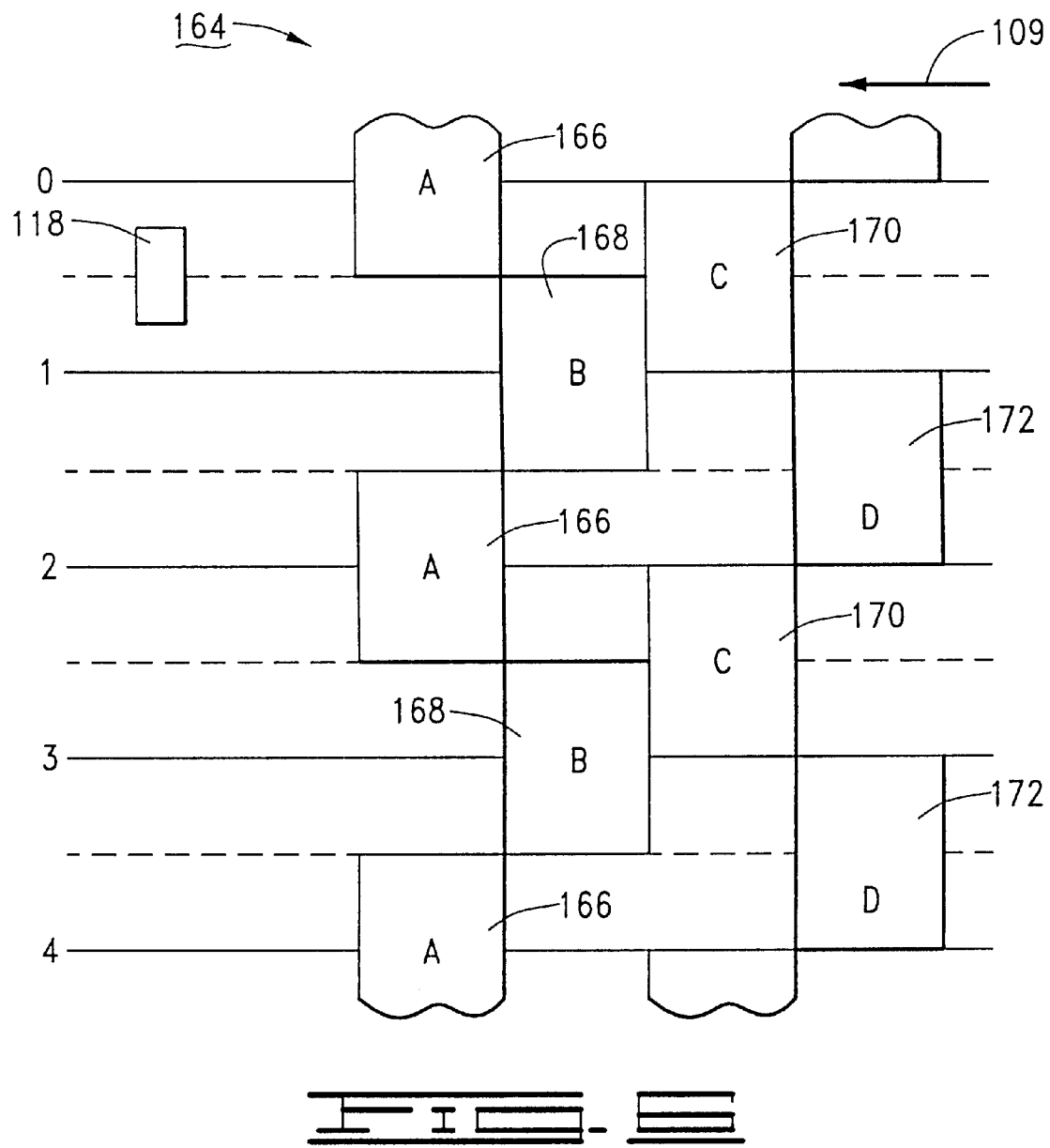

The servo data are preferably arranged on the discs 108 as shown in FIGS. 3–5. FIG. 3 provides a portion of a selected one of the discs 108 with a plurality of servo wedges 150 which radially extend from the innermost to the outermost radii of the disc recording surface. The servo wedges 150 are written during disc drive manufacturing and each servo wedge comprises a plurality of radially aligned servo fields, with each servo field corresponding to a particular track on the disc surface. As will be recognized, user data are stored in the areas between adjacent servo wedges.

FIG. 4 shows a portion of a track 152 at a selected radius on the disc 108, illustrating the arrangement of respective servo fields 154 and user data fields 156. Each servo field 154 preferably includes an automatic gain control (AGC) field 158, an index field 160, a Gray code (GC) field 162 and a position (POS) field 164. The AGC field 158 provides an oscillating signal that prepares the servo circuit 140 for remaining portions of the servo field 154, the GC field 162 provides a unique track address to indicate radial position for the track, and the POS field 164 provides an arrangement of servo burst patterns that allows the servo circuit 140 to perform intra-track positioning. It will be apparent that other servo field configurations can be readily employed.

FIG. 5 illustrates the POS field 164 in greater detail for a number of adjacent tracks with track boundaries denoted as 0–4. First, second, third and fourth types of servo burst patterns, respectively identified as A, B, C, and D patterns at 166, 168, 170 and 172, are preferably arranged as shown. More particularly, edges from each of the A and B burst patterns 166, 168 are substantially colinear at track centers, and edges from each of the C and D burst patterns 170, 172 are substantially colinear at track boundaries. When the A, B, C and D burst patterns 166, 168, 170 and 172 pass underneath the corresponding head 118 (in the direction indicated by arrow 109 from FIG. 1), servo burst signals are generated in relation to the relative location of the head with respect to each of the patterns. Because the A and B burst patterns 166, 168 are written at the same frequency, but 180 degrees out of phase, a first null is formed at the track centers. Similarly, the C and D burst patterns 170, 172 are written at the same frequency, but 180 degrees out of phase, to form a second null at each of the track boundaries. It will be noted that although the arrangement of FIG. 5 places the first nulls at track centers and the second nulls at track boundaries, such is not limiting to the present invention. Moreover, it is not necessarily required that the A, B and the C, D patterns be angularly aligned as shown in FIG. 5; for example, in an alternative embodiment, the A, B, C and D burst patterns are written in a quadrature ("offset checkerboard") pattern such as shown in FIG. 6.

During operation, as the head 118 passes over the A, B, C and D patterns, the servo circuit 140 preferably generates two signals denoted as PS1 and PS2, defined as follows:

$$PS1 = (A-B) \quad (1)$$

$$PS2 = (C-D) \quad (2)$$

It will be noted that in the configuration of FIG. 5, the PS1 and PS2 signals are generated directly by the head, since the A, B and the C, D patterns are read at the same time. In the configuration of FIG. 6, the A, B, C, and D patterns are read sequentially and result in separate A, B, C and D burst signals which are combined as shown by equations (1) and (2) to form the PS1 and PS2 values.

Figure 7:
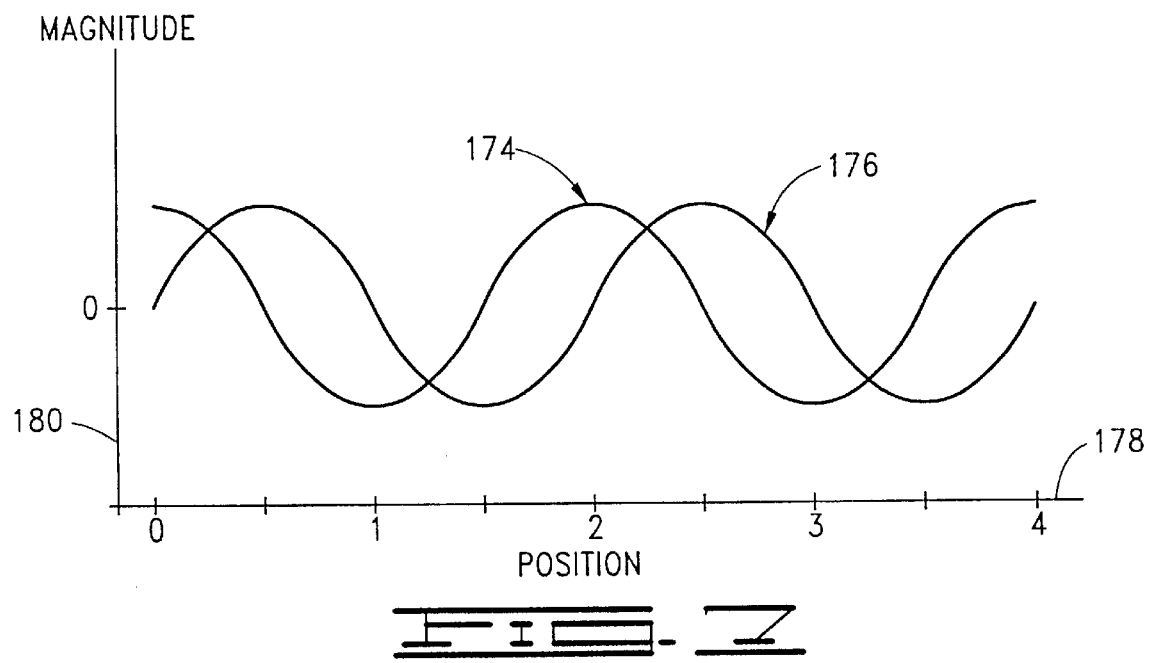
FIG. 7 is a graphical representation of position signals PS1 and PS2, generated in response to the position fields of FIG. 5.

FIG. 7 provides a PS1 signal curve 174 and a PS2 signal curve 176, plotted against a common x-axis 178 indicative of position (corresponding to the track boundaries 0–4 of FIG. 5) and a common y-axis 180 indicative of relative magnitude. The actual shape of the PS1 and PS2 signal curves 174, 176 will typically vary by head. This is because a population of nominally identical heads will necessarily have some variation in head width, symmetry, sensitivity, etc., and these factors will affect the particular characteristics of the PS1 and PS2 signal curves.

In order to control the position of the selected head 118 during reading and writing operations, the servo circuit 140 must be able to determine, with reasonable accuracy, the actual position of the head 118 from the servo burst signals. To be economically viable, the particular approach taken by the servo circuit 140 must be able to accommodate relatively large amounts of head variation.

A variety of approaches for determining an appropriate position error signal (PES) have been proposed; for example, as discussed in U.S. Pat. No. 5,774,297 issued Jun. 30, 1998 to Hampshire et al. and U.S. Pat. No. 5,867,341 issued Feb. 2, 1999 to Volz et al., the track can be divided into subportions (such as quadrants ¼ track wide) and different combinations of the servo burst signals can be utilized in relation to which subportion over which the head is positioned. Such approaches have included the use of compensation techniques to minimize discontinuities in the PES at the subportion boundaries.

In another approach, such as discussed in U.S. Pat. No. 6,046,879 issued Apr. 4, 2000 to Hampshire et al., a continuous, or "seamless" function uses the same combination of the servo burst signals all the way across the track. This results in very accurate determination of the head position at five points across the track: at both track boundaries, at track center, and at quarter-track positions halfway between the track center and track boundaries. One example of a seamless function is given by the following relation:

$$PES = \frac{(PS1)\,\text{sign}(PS2)}{2(|PS1| + |PS2|)}. \quad (3)$$

Figure 8:
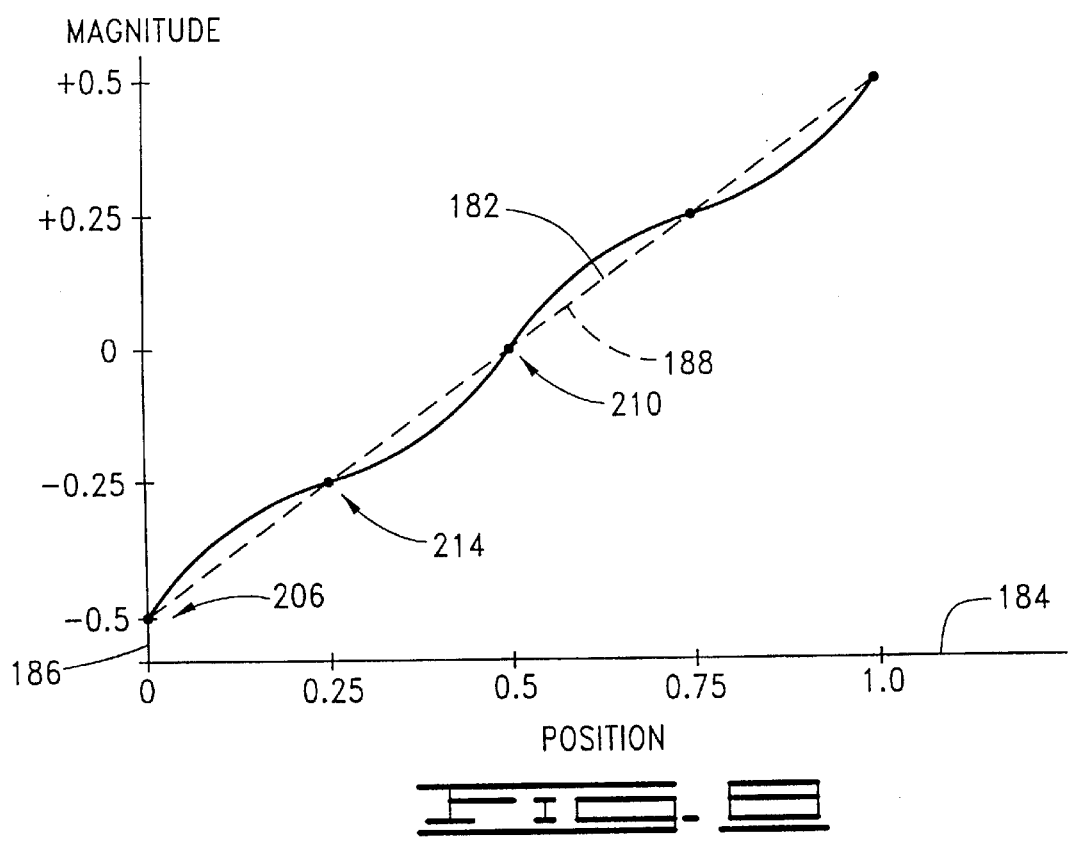
FIG. 8 is a representation of a continuous (seamless) position error signal (PES) generated in response to the PS1 and PS2 signals of FIG. 6.

FIG. 8 provides a seamless PES signal curve 182 generated using equations (1) through (3). The curve 182, plotted against a single track on x-axis 184 and a normalized y-axis 186, provides magnitudes of 0 at track centers (first nulls), ±0.5 at track boundaries (second nulls), and ±0.25 at quarter-track locations halfway between the track centers and track boundaries. The curve 182 does not provide constant slope at positions between these five points, however, as evidenced by the differences between the curve 182 and ideal PES signal curve 188 (shown in broken line fashion).

The aforementioned U.S. Pat. No. 6,046,879 compensates for this nonconstant slope by using two continuous, seamless functions that fall on opposing sides of the ideal curve 188 and using a weighted sum of the two functions to arrive at a substantially constant slope.

By contrast, the present invention utilizes a higher order seamless PES combination to provide a substantially constant slope in the PES, in accordance with the following generalized relation:

$$PES = \frac{|f(PS1)|\,\text{sign}(PS1)\,\text{sign}(PS2)}{2(|f(PS1)| + |f(PS2)|)} \quad (4)$$

where f(PS1) and f(PS2) are at least third order polynomial functions of PS1 and PS2, respectively.

In accordance with a first preferred embodiment, the functions f(PS1) and f(PS2) of equation (4) are defined as follows:

$$f(PS1) = a_1|PS1| + a_2|PS1^2| + a_3|PS1^3| \quad (5)$$

$$f(PS2) = b_1|PS2| + b_2|PS2^2| + b_3|PS2^3| \quad (6)$$

where $a_1$, $a_2$, $a_3$, $b_1$, $b_2$ and $b_3$ are constants selected in relation to performance characteristics of the head to provide the substantially linear slope between the first and second nulls. The constants are selected in accordance with a PES COMPENSATION routine 200 set forth in FIG. 9. The routine 200 preferably represents programming steps carried out by the DSP 144 of FIG. 2 for each selected head 118 in turn.

At step 202, initial values for the constants are selected. Preferably, the first order constants $a_1$ and $b_1$ are each set to 1, the third order constants $a_3$ and $b_3$ are set to 0, and the second order constants $a_2$ and $b_2$ are set to some non-zero value. In this way, optimum values of the second order constants can first be determined, after which similar optimization can occur for the third order constants.

At step 204, the servo circuit 140 moves the selected head 118 over a selected track boundary (such as the point 206 in FIG. 8) and a slope S1 of the PES is measured, step 208. The slope is preferably measured by causing the head 118 to oscillate over a very small range proximate the selected track boundary and measuring the difference in PES value obtained. It will be recognized that the head 118 can alternatively be positioned over a track center (such as the point 210 in FIG. 8), or positioned at a number of track boundaries and track centers with an average slope being determined therefrom.

Once the slope S1 is determined, at step 212 the servo circuit 140 proceeds to position the head over a quarter-track location (such as the point 214 in FIG. 8) halfway between an adjacent track boundary and track center, and a second slope S2 is measured in similar fashion, step 216. As before, an average slope can be determined using multiple quarter-track locations, as desired.

Once the slopes S1 and S2 have been determined, decision step 218 determines whether the absolute value of the difference between the slopes is less than an acceptance threshold T; if not, the routine continues to step 220 where the constants are incremented and the routine passes back to step 204. In this way, the routine continues until an acceptably linear slope for the PES is determined, after which the final values of the constants are stored at step 222 and the routine ends at step 224. Although an acceptance threshold T has been represented in decision step 218, it is contemplated that the second order constants could be adjusted until a minimum difference between the slopes S1 and S2 is found, after which the routine continues with the adjustment of the third order constants.

Figure 9:
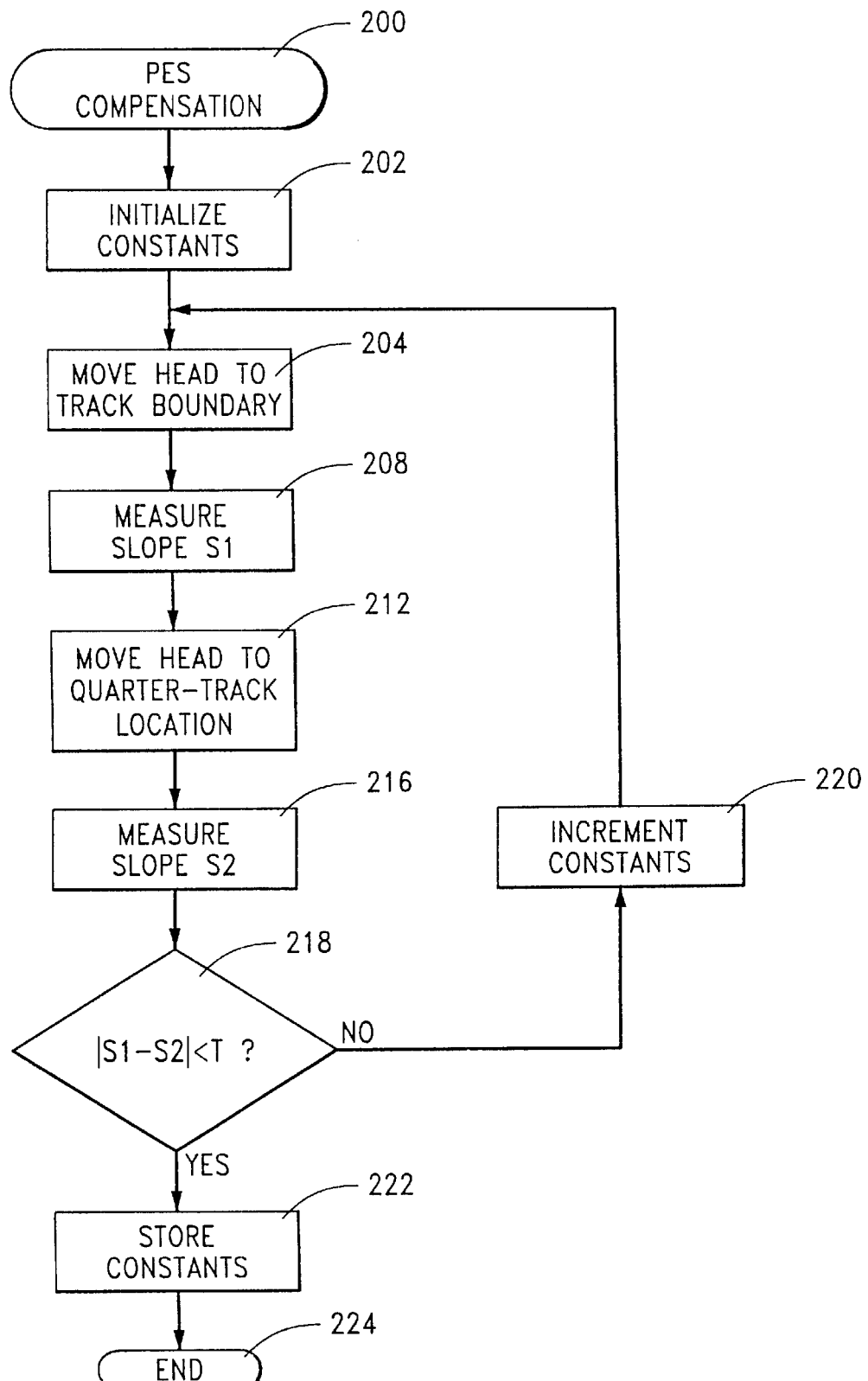
FIG. 9 is a PES COMPENSATION routine illustrating steps carried out in accordance with a preferred embodiment of the present invention.

The use of the third order polynomial functions of equations (5) and (6) in accordance with the routine of FIG. 9 has been found to provide substantially linear slope PES characteristics for a wide range of head variation. Higher order terms (fourth order, fifth order, etc.) are contemplated as well, but these additional terms are generally mathematically challenging to implement economically.

A second embodiment of the present invention employs series expansion to provide an infinite order polynomial representation. For example, the functions f(PS1) and f(PS2) can be alternatively set as follows:

$$f(PS1) = \frac{|PS1|}{(1+k) - |PS1|} \quad (7)$$

$$f(PS2) = \frac{|PS2|}{(1+k) - |PS2|} \quad (8)$$

where k is a constant selected in relation to performance characteristics of the head to provide the substantially linear slope between the first and second nulls. The constant k can be determined in accordance with a PES COMPENSATION routine 230 shown in FIG. 10. As before, the routine 230 preferably represents programming steps carried out by the DSP 144 of FIG. 2 and is performed on a head-by-head basis.

At step 232, an initial value for k is selected (k is preferably a small number not close to −1). The selected head 118 is moved to a track boundary (such as point 206 in FIG. 8) at step 234 and a first slope S1 of the PES is measured, step 236. The selected head 118 is then moved to a quarter-track location (such as point 214 in FIG. 8) at step 238 and a second slope S1 of the PES is measured, step 240. The absolute value of the difference between the slopes S1 and S2 is then compared to an acceptance threshold T, decision step 242. If the difference exceeds the threshold, the routine continues to step 244 wherein the constant k is incremented.

Figure 10:
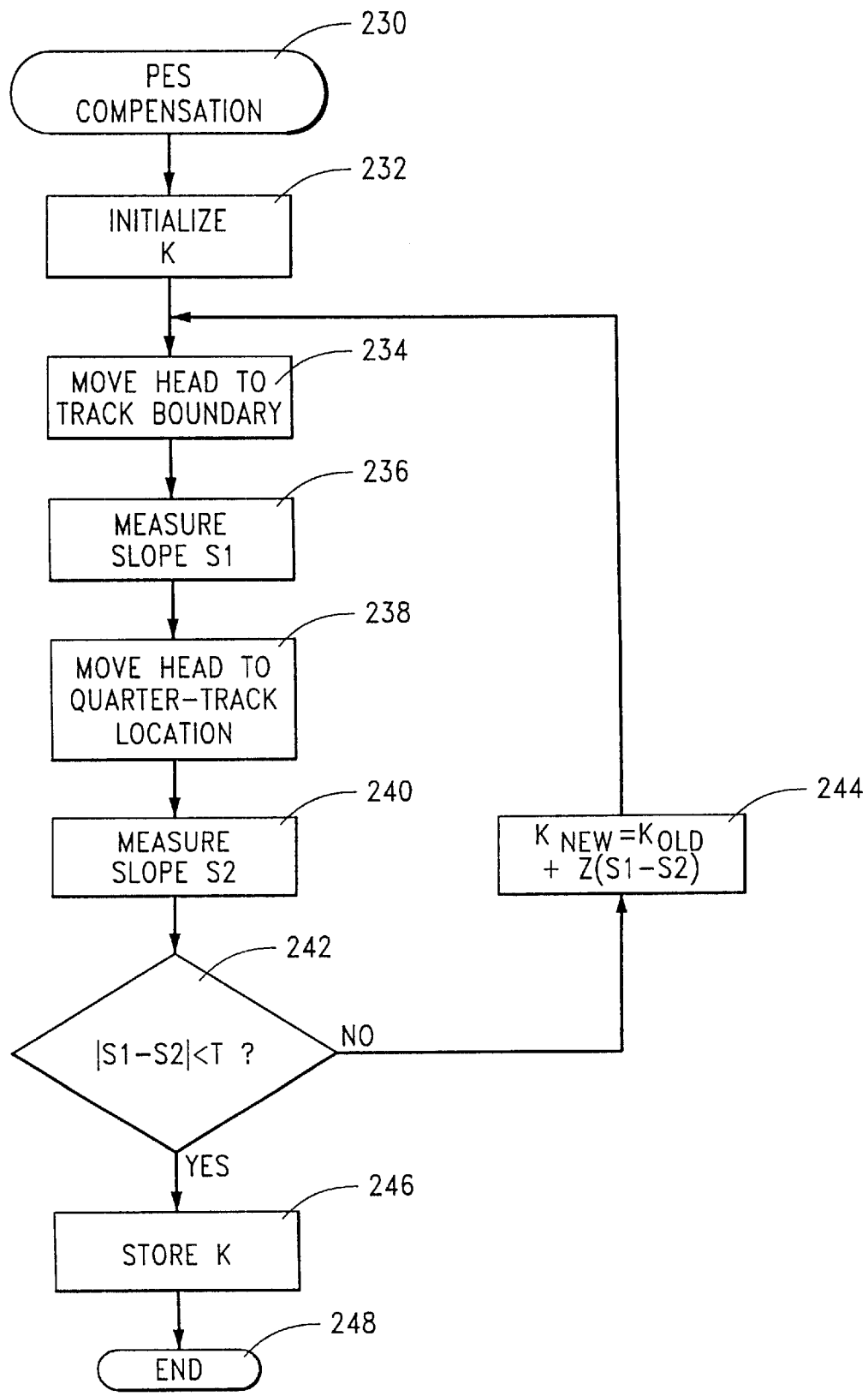
FIG. 10 is another PES COMPENSATION routine illustrating steps carried out in accordance with another preferred embodiment of the present invention.

As shown in FIG. 10, this is preferably carried out by generating a new value of k by adding to the old (existing) value an increment value of z(S1−S2), with z comprising a convergence factor to control the rate of convergence of k to its final value. The routine thus continues until a final value of k is determined, after which this value is stored at step 246 and the routine ends at step 248.

The foregoing embodiments have been found to provide substantially linear PES signals (i.e., such as represented by ideal curve 188 in FIG. 8) for a wide range of variation in head symmetry, sensitivity and widths. Thus, a potentially wider range of head width and performance variations can be accommodated, reducing manufacturing costs through the relaxation of head width tolerances and improvements in manufacturing yields. Information can further be collected and provided to head suppliers regarding the extent of variations observed during the manufacturing process, resulting in improved head manufacturing process control. As will be recognized, it is generally difficult for a disc drive manufacturer to assess variations in effective read element head width for a population of heads without the utilization of time and resource intensive efforts.

In summary, it will now be recognized that the present invention is directed to an apparatus and method for improving servo control in a disc drive. In accordance with preferred embodiments, a disc drive 100 is provided with a rotatable disc 108 on which a plurality of concentric tracks are defined by first, second, third and fourth radially staggered burst patterns 166, 168, 170 and 172, each having a burst pattern width, wherein the first and second burst patterns are arranged such that an edge from each of the first and second burst patterns are substantially colinear to form a first track null, wherein the third and fourth burst patterns are arranged such that an edge from each of the third and fourth burst patterns are substantially colinear to form a second track null, and wherein the third and fourth burst patterns are radially offset from the first and second bursts by one half of a burst width.

An actuator assembly 1110 comprises a transducing head 118 which is supported adjacent the tracks and an actuator motor 124 which controllably moves the head.

A servo circuit 140 applies current to the actuator motor to position of the head relative to a selected track, wherein the servo circuit receives respective burst signals from the head as the head transduces the first, second, third and fourth burst patterns associated with the selected track, determines a first combined burst signal PS1 as a difference between the magnitude of a burst signal transduced from the second burst pattern and a magnitude of the burst signal transduced from the first burst pattern, determines a second combined burst signal PS2 as a difference between a magnitude of the burst signal transduced from the fourth burst pattern and a magnitude of the burst signal transduced from the third burst pattern, and combines respective at least third order polynomial functions of PS1 and PS2 to provide a continuous function position error signal with normalized absolute magnitudes of 0 when the head is positioned at the first nulls, 0.5 when the head is positioned at the second nulls, 0.25 at positions halfway between first and second nulls, and with substantially linear slope between the first and second nulls, wherein the servo circuit applies the current to the actuator motor in relation to a magnitude of the position error signal.

Preferably, the PES function is given by the general relation of equation (4).

In one embodiment, the functions f(PS1) and f(PS2) are third order polynomial functions as set forth by equations (5) and (6). In another embodiment, the functions f(PS1) and f(PS2) are infinite order polynomial functions set forth by the series expansions of equations (7) and (8).

For purposes of the following claims, the terms "circuit" and "circuitry" will be understood to apply to both hardware and software/firmware implementations. The phrase "continuous function position error signal" will be understood consistently with the foregoing discussion to describe a function that uses the same combination of burst signals across the entire width of a track. Although certain method claims below are provided with steps in a particular order, it will be readily understood that the claimed invention is not necessarily limited to the order of the steps presented, unless otherwise particularly indicated by the language of the claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive which uses a transducing head to store and retrieve data to and from a plurality of concentric tracks defined on a rotatable disc surface, a method for positioning the head adjacent a selected track, comprising steps of:

(a) providing the disc surface with first, second, third and fourth radially staggered burst patterns each having a burst width, wherein the first and second burst patterns are arranged such that the edges from each of the first and second burst patterns are substantially collinear to form a first null, wherein the third and fourth burst patterns are arranged such that the edges from each of the third and fourth burst patterns substantially collinear to form a second null, and wherein the third and fourth burst patterns are radially offset from the first and second bursts by one half of a burst width;

(b) defining a first combined burst signal PS1 as a difference between a magnitude of a burst signal transduced from the first burst pattern and a magnitude of a burst signal transduced from-the second burst pattern;

(c) defining a second combined burst signal PS2 as a difference between a magnitude of a burst signal transduced from the third burst pattern and a magnitude of a burst signal transduced from the fourth burst pattern;

(d) combining respective at least third order polynomial functions of PS1 and PS2 to provide a continuous position error signal with substantially linear slope between the first and second nulls; and (e) applying current to a motor coupled to the head to position the head in relation to a magnitude of the position error signal.

2. The method of claim 1, wherein the at least third order polynomial function of PS1 is characterized as f(PS1), wherein the at least third order polynomial function of PS2 is characterized as f(PS2), and wherein the combining step (d) comprises a step of:

(d1) combining f(PS1) and f(PS2) to form the position error signal in accordance with the following relation:

$$\frac{|f(PS1)|\,\mathrm{sign}(PS1)\,\mathrm{sign}(PS2)}{2(|f(PS1)|+|f(PS2)|)}.$$

3. The method of claim 2, wherein the combining step (d) further comprises steps of:

(d2) defining f(PS1) to include the relation $a_1|PS1|+a_2|PS1^2|+a_3|PS1^3|$, wherein $a_1$, $a_2$ and $a_3$ are constants selected in relation to performance characteristics of the head to provide the substantially linear slope between the first and second nulls; and (d3) defining f(PS2) to include the relation $b_1|PS2|+b_2|PS2^2|+b_3|PS2^3|$, wherein $b_1$, $b_2$ and $b_3$ are constants selected in relation to performance characteristics of the head to provide the substantially linear slope between the first and second nulls.

4. The method of claim 3, wherein the constants $a_1$, $a_2$, $a_3$, $b_1$, $b_2$, and $b_3$ are selected by steps of:

(d4) setting the constants $a_1$, $a_2$, $a_3$, $b_1$, $b_2$, and $b_3$ to respective initial values;

(d5) positioning the head over a selected null;

(d6) obtaining a measurement S1 of the slope of the position error signal;

(d7) positioning the head halfway between adjacent first and second nulls;

(d8) obtaining a measurement S2 of the slope of the position error signal;

(d9) comparing a difference between S1 and S2 to an acceptance threshold T;

(d10) when the difference between S1 and S2 is greater than T, incrementing at least a selected one of the constants $a_1$, $a_2$, $a_3$, $b_1$, $b_2$, and $b_3$ and repeating steps (d3) and (d9); and (d11) when the difference between S1 and S2 is less than T, storing the most recently incremented values for the constants $a_1$, $a_2$, $a_3$, $b_1$, $b_2$, and $b_3$ for subsequent use of the disc drive during the applying step (e).

5. The method of claim 2, wherein the combining step (d) further comprises steps of:

(d2) defining f(PS1) as a series expansion $|PS1|/((1+k)-|PS1|)$; and (d3) defining f(PS2) as a series expansion $|PS2|/((1+k)-|PS2|)$, wherein k is a constant selected in relation to performance characteristics of the head to provide the substantially linear slope between the first and second nulls.

6. The method of claim 5, wherein the constant k is selected by steps of:

(d4) setting the constant k to an initial value;

(d5) positioning the head over a selected null;

(d6) obtaining a measurement S1 of the slope of the position error signal;

(d7) positioning the head halfway between adjacent first and second nulls;

(d8) obtaining a measurement S2 of the slope of the position error signal;

(d9) comparing a difference between S1 and S2 to an acceptance threshold T;

(d10) when the difference between S1 and S2 is greater than T, incrementing the constant k and repeating steps (d3) and (d9); and (d11) when the difference between S1 and S2 is less than T, storing the final value for the constant k for subsequent use of the disc drive during the applying step (e).

7. The method of claim 6, wherein the constant k is incremented by adding a value z(S1−S2), where z is a convergence factor selected to control rate of convergence of the constant k to the final value.

8. A disc drive, comprising:
   a rotatable disc surface on which a plurality of concentric tracks are defined by first, second, third and fourth radially staggered burst patterns each having a burst pattern width, wherein the first and second burst patterns are arranged such that edges from each of the first and second burst patterns are substantially colinear to form a first track null, wherein the third and fourth burst patterns are arranged such that edges from each of the third and fourth burst patterns are substantially colinear to form a second track null, and wherein the third and fourth burst patterns are radially offset from the first and second bursts by one half of a burst width;
   an actuator assembly comprising a transducing head adjacent the tracks and an actuator motor which controllably moves the head;
   a servo circuit which applies current to the actuator motor to position of the head relative to a selected track, wherein the servo circuit receives respective burst signals from the head as the head transduces the first, second, third and fourth burst patterns associated with the selected track, determines a first combined burst signal PS1 as a difference between the magnitude of a burst signal transduced from the first burst pattern and a magnitude of the burst signal transduced from the second burst pattern, determines a second combined burst signal PS2 as a difference between a magnitude of the burst signal transduced from the third burst pattern and a magnitude of the burst signal transduced from the fourth burst pattern, and combines respective at least third order polynomial functions of PS1 and PS2 to provide a continuous function position error signal with substantially linear slope between the first and second nulls, wherein the servo circuit applies the current to the actuator motor in relation to a magnitude of the position error signal.

9. The disc drive of claim 8, wherein the at least third order polynomial function of PS1 is characterized as f(PS1), wherein the at least third order polynomial function of PS2 is characterized as f(PS2), and wherein the servo circuit combines f(PS1) and f(PS2) to form the position error signal in accordance with the following relation:

$$\frac{|f(PS1)|\,\text{sign}(PS1)\,\text{sign}(PS2)}{2(|f(PS1)|+|f(PS2)|)}.$$

10. The disc drive of claim 9, wherein the servo circuit further determines f(PS1) to include the relation $a_1|PS1|+a_2|PS1^2|+a_3|PS1^3|$ and determines f(PS2) to include the relation $b_1|PS2|+b_2|PS2^2|+b_3|PS2^3|$, wherein $a_1$, $a_2$ and $a_3$, $b_1$, $b_2$ and $b_3$ are constants selected in relation to performance characteristics of the head to provide the substantially linear slope between the first and second nulls.

11. The disc drive of claim 10, wherein the constants $a_1$, $a_2$, $a_3$, $b_1$, $b_2$, and $b_3$ are selected in accordance with a method comprising steps of:
   (a) setting the constants $a_1$, $a_2$, $a_3$, $b_1$, $b_2$, and $b_3$ to respective initial values;
   (b) positioning the head over a selected null;
   (c) obtaining a measurement S1 of the slope of the position error signal;
   (d) positioning the head halfway between adjacent first and second nulls;
   (e) obtaining a measurement S2 of the slope of the position error signal;
   (f) comparing a difference between S1 and S2 to an acceptance threshold T;
   (g) when the difference between S1 and S2 is greater than T, incrementing at least a selected one of the constants $a_1$, $a_2$, $a_3$, $b_1$, $b_2$, and $b_3$ and repeating steps (d3) and (d9); and
   (h) when the difference between S1 and S2 is less than T, storing the most recently incremented values for the constants $a_1$, $a_2$, $a_3$, $b_1$, $b_2$, and $b_3$ for subsequent use of the servo circuit.

12. The disc drive of claim 8, wherein the servo circuit further determines f(PS1) as the series expansion $|PS1|/((1+k)-|PS1|)$ and determines f(PS2) as the series expansion $|PS2|/((1+k)-|PS2|)$, wherein k is a constant selected in relation to performance characteristics of the head to provide the substantially linear slope between the first and second nulls.

13. The disc drive of claim 12, wherein the constant k is selected in accordance with a method comprising steps of:
   (a) setting the constant k to an initial value;
   (b) positioning the head over a selected null;
   (c) obtaining a measurement S1 of the slope of the position error signal;
   (d) positioning the head halfway between adjacent first and second nulls;
   (e) obtaining a measurement S2 of the slope of the position error signal;
   (f) comparing a difference between S1 and S2 to an acceptance threshold T;
   (g) when the difference between S1 and S2 is greater than T, incrementing the constant k and repeating steps (b) and (f); and
   (h) when the difference between S1 and S2 is less than T, storing the final value for the constant k for subsequent use by the servo circuit.

14. The disc drive of claim 13, wherein the constant k is incremented by adding a value z(S1−S2), where z is a convergence factor selected to control rate of convergence of the constant k to the final value.

15. A data storage device, comprising:
   a rotatable disc having a recording surface on which a plurality of concentric tracks are defined by servo data written to the recording surface;
   an actuator which supports a data transducing head adjacent the recording surface;
   an actuator motor which operates upon the actuator to move the head across the recording surface; and
   a servo circuit which applies current to the actuator motor to position the head relative to a selected track by generating first and second combined burst signals from selected servo data associated with the selected track, determining respective at least third order polynominal functions of said first and second combined burst signals, and combining the respective at least third order polynomial functions to generate a continuous function position error signal indicative that describes position error of the head as the head moves across a full width of the selected track.

16. A method for positioning a head adjacent a selected track on a recording surface in a data storage device, comprising:
   generating first and second combined burst signals from servo data on the recording surface;

determining respective at least third order polynominal functions of said first and second combined burst signals; and combining the respective at least third order polynomial functions to generate a continuous function position error signal that describes position error of the head as the head moves across a full width of the selected track; and applying current to a motor coupled to, the head to position the head in relation to a magnitude of the continuous function position error signal.

17. The method of claim 16, wherein the respective at least third order polynominal functions of said first and second combined burst signals of the determining step are respectively characterized as f(PS1) and f(PS2), and wherein the combining step comprises combining f(PS1) and f(PS2) in accordance with the following relation:

$$\frac{|f(PS1)|\,\text{sign}(PS1)\,\text{sign}(PS2)}{2(|f(PS1)|+|f(PS2)|)}.$$

18. The method of claim 16, further comprising a step of providing the recording surface with first, second, third and fourth radially staggered burst patterns each having a burst pattern width, wherein the first and second burst patterns are substantially collinear to form a first null and the third and fourth burst patterns are substantially collinear to form a second null radially offset from the first null.

19. The method of claim 18, and wherein the generating steps comprises defining the first combined burst signal as a difference between a magnitude of a burst signal transduced from the first burst pattern and a magnitude of a burst signal transduced from the second burst pattern.

20. The method of claim 18, and wherein the generating steps comprises defining the second combined burst signal as a difference between a magnitude of a burst signal transduced from the third burst pattern and a magnitude of a burst signal transduced from the fourth burst pattern.

* * * * *